(12) United States Patent
Mather et al.

(10) Patent No.: US 6,355,765 B1
(45) Date of Patent: Mar. 12, 2002

(54) WHOLLY AROMATIC THERMOTROPIC COPOLYESTERS WITH CONTROLLED FLEXIBILITY

(75) Inventors: Patrick T. Mather, Storrs, CT (US); Devdatt S. Nagvekar, Louisville, KY (US); Hong G. Jeon, Huber Heights; Loon-Seng Tan, Centerville, both of OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/668,978

(22) Filed: Sep. 25, 2000

Related U.S. Application Data

(60) Provisional application No. 60/205,915, filed on May 22, 2000.

(51) Int. Cl.$^7$ ................................................ C08G 63/02

(52) U.S. Cl. ........................ 528/194; 528/176; 528/190; 528/191; 528/193

(58) Field of Search ................................. 528/176, 190, 528/191, 193, 194

(56) References Cited

U.S. PATENT DOCUMENTS

| | | |
|---|---|---|
| 4,999,416 A | 3/1991 | Kaminade et al. |
| 5,391,688 A | 2/1995 | Mazaki et al. |

OTHER PUBLICATIONS

D. S. Nagvekar, P. T. Mather, H. G. Jeon, L–S Tan, "New Wholly–Aromatic Thermotropic Polyesters with Controlled Flexibility", Materials Research Society Symposium Proceedings, vol. 559, pp. 165–170 (1999). Published Aug. 11, 1999.

Primary Examiner—Samuel A. Acquah
(74) Attorney, Agent, or Firm—Charles E. Bricker; Thomas L. Kundert

(57) ABSTRACT

A wholly aromatic copolyester having repeating units of the formula:

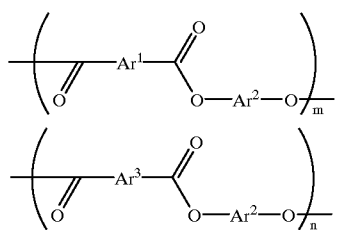

wherein $Ar^1$ is

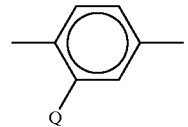

wherein Q is selected from the group consisting of —H, —CH$_3$, —CF$_3$, —Cl, —Br, and —C$_6$H$_5$;
wherein $Ar^2$ is selected from the group consisting of

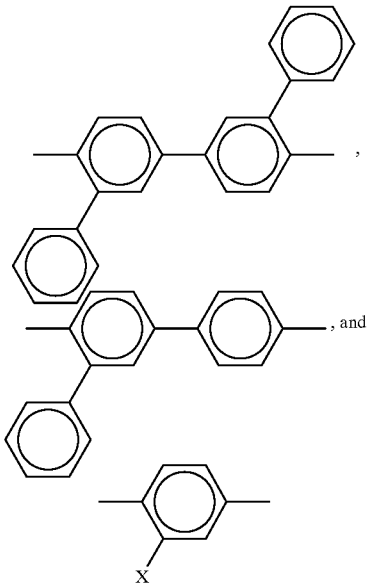

, and wherein X is selected from the group consisting of —Br, —Cl, —CH$_3$ and —C$_6$H$_5$;
wherein $Ar^3$ is

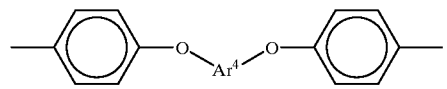

wherein $Ar^4$ is selected from the group consisting of

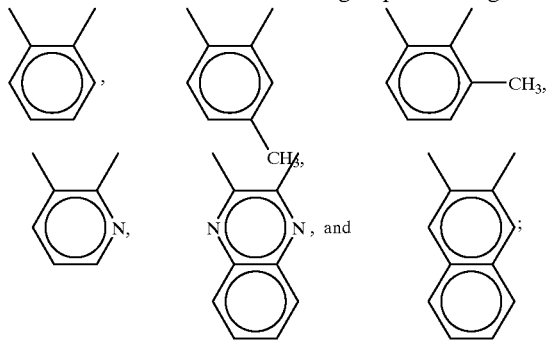

wherein m has a value of 0.05 to 0.95 and n has a value of 100-m, is characterized by accessible nematic-isotropic transition temperatures providing outstanding orientational order and mechanical properties.

6 Claims, No Drawings

WHOLLY AROMATIC THERMOTROPIC COPOLYESTERS WITH CONTROLLED FLEXIBILITY

This application claims the benefit of U.S. Provisional application Ser. No. 60/205,915, filed May 22, 2000.

RIGHTS OF THE GOVERNMENT

The invention described herein may be manufactured and used by or for the Government of the United States for all governmental purposes without the payment of any royalty.

BACKGROUND OF THE INVENTION

The present invention relates to wholly aromatic copolyesters, particularly wholly aromatic copolyesters with controlled flexibility.

Aromatic copolyesters which are para-linked are known to feature thermotropic behavior in which heating the semi-crystalline solid results in melting to a mesomorphic phase, often nematic, giving rise to desirable molding characteristics, mechanical properties, and solvent resistance. Often, their high modulus and strength come at the expense of low toughness, manifested as failure strains less than 5%. In addition, such polymers feature nematic-isotropic transition temperatures in excess of thermal decomposition, eliminating the potential benefit of traversing the isotropic-nematic phase transition during processing.

Since thermotropic liquid crystallinity in polymers was first discovered in the 1970's, thermotropic liquid-crystalline polymers (LCPs) have been predominantly aromatic polyesters. The two major commercial materials are wholly aromatic polyesters made from diacids (AA) and diols (BB), as well as from AB-type monomers, such as 2-hydroxy, 6-carboxylic acid naphthalene. These wholly-aromatic, para-linked, polyesters have found usage primarily as molding resins with mechanical properties approaching those of polymer matrix composites. In addition, fiber and film products are beginning to emerge.

Despite the success of thermotropic LCP technology, there are several significant challenges to be addressed. The first of these is the large disparity in mechanical properties between molding (30 ksi strength) and fiber spun (400 ksi strength) articles. Second is the extreme sensitivity of mechanical properties to the conditions of melt processing, such as extrusion speeds, temperature profile, and die design.

We have synthesized LCPs characterized by accessible nematic-isotropic transition temperatures leading to two effects. First, the nematic defect history can be "erased" to obtain a reproducible starting morphology for processing. Second, the flow-induced isotropic-nematic transition can be exploited to obtain outstanding orientational order and mechanical properties.

Accordingly, it is an object of the present invention to provide novel liquid-crystalline polymers.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided a wholly aromatic copolyester having repeating units of the formula:

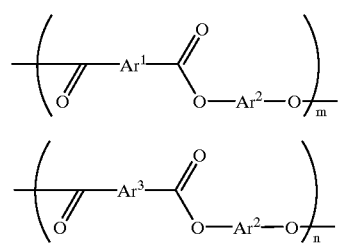

wherein $Ar^1$ is

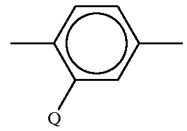

wherein Q is selected from the group consisting of —H, —$CH_3$, —$CF_3$, —Cl, —Br, and —$C_6H_5$;

wherein $Ar^2$ is selected from the group consisting of

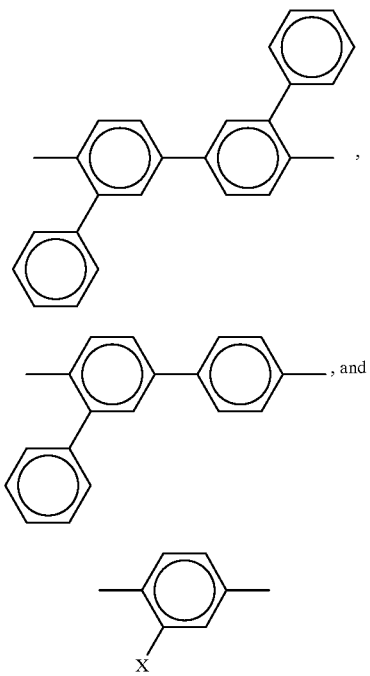

wherein X is selected from the group consisting of —Br, —Cl, —$CH_3$ and —$C_6H_5$;

wherein $Ar^3$ is

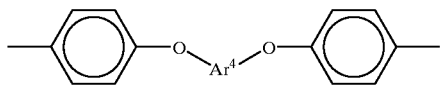

wherein Ar⁴ is selected from the group consisting of

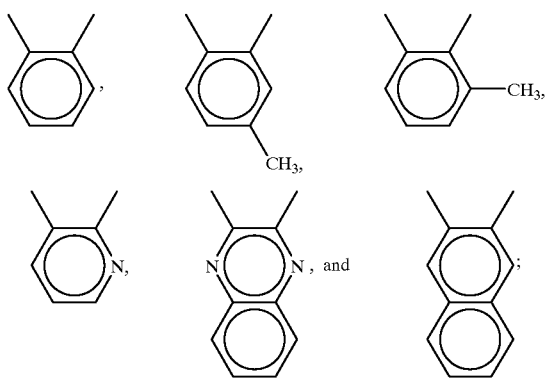

and wherein m has a value of 0.05 to 0.95 and n has a value of 100-m.

DETAILED DESCRIPTION OF THE INVENTION

The wholly aromatic copolyesters of this invention are prepared by the condensation copolymerization of a para-linked dicarboxylic acid of the formula HOOC—Ar¹—COOH (hereinafter referred to as A), a para-linked diol of the formula HO—Ar²—OH (hereinafter referred to as B), and a dicarboxylic acid of the formula HOOC—Ar³—COOH (hereinafter referred to as C), wherein Ar¹, Ar² and Ar³ are as defined above. The polymerization method includes, but is not limited to, polymerization methods known in the art, for example, the melt polymerization method or solution polymerization method can be used for synthesis.

In the case where the copolyesters of the present invention are produced by solution polymerization, for example a predetermined amount of each of the HOOC—Ar¹—COOH, HO—Ar²—OH, and HOOC—Ar³—COOH monomers are dissolved in a solvent and heated. Alternatively, the monomers are dissolved in an acid acceptor such as pyridine and heated in the presence of aryl sulfonyl chloride/dimethylformamide or diphenyl chlorophosphateldimethylformamide whereby the desired copolyester can be easily obtained.

The charging ratio (molar ratio) of the A, B and C monomer components in synthesis of the copolyesters of the present invention by solution polymerization is as follows. The sum of A+C=B, and the ratio A:C can range from 5:95 to 95:5, preferably 10:90 to 90:10, more preferably 80:20 to 60:40.

The solvent used for solution polymerization includes, but is not limited to, halogen based solvents such as o-dichlorobenzene, dichloroethane, tetrachloroethane and the like, polar solvents such as dimethyl sulfoxide (DMSO), dimethylformamide (DMF), N-methylpyrrolidone (NMP) and the like, and ether based solvents such as tetrahydrofuran (THF), dioxane and the like. The acid acceptor includes, but is not limited to, pyridine, triethylamine, tripropylamine and the like. Although the reaction conditions for solution polymerization are not particularly limited, the temperature is usually 50° to 200° C., preferably 60° to 150° C., and the reaction time is usually 1 hour or more, preferably about 2 hours to 10 hours.

The following examples illustrate the invention. In these examples, the designator OPDB is employed to indicate the quantity of 4,4'-(1,2-benzenedioxy)dibenzoic acid in the polymer/copolymer.

EXAMPLE I

Preparation of 4,4'-(1,2-benzenedioxy)dibenzonitrile

A suspension of potassium carbonate (26.5 g, 192 mmol) and catechol (10.63 g, 96.54 mmol) in dimethylacetamide (600 mL) containing toluene (100 mL) was refluxed using Dean-stark apparatus. After 3 h, para-fluorobenzonitrile (23.4 g, 193 mmol) was added and reaction was continued for 24 h. Upon cooling, the reaction mixture was evaporated. The organic product was dissolved in ethyl acetate and filtered through Celite. Evaporation of the solution gave a solid which after recrystallization from ethanol gave 4,4'-(1,2-benzenedioxy)dibenzonitrile (26 g), 86% yield, mp=112.5° C.

EXAMPLE II

Preparation of 4,4'-(1,2-benzenedioxy)dibenzoic acid

48% Hydrobromic acid (95 mL) was added to a suspension of 4,4'-(1,2-benzenedioxy)dibenzonitrile (25.754 g, 82.49 mmol) in acetic acid (260 mL) and refluxed for 20 h. The reaction was cooled to 0° C. when 4,4'-(1,2-benzenedioxy)dibenzoic acid precipitated. The white crystals were washed with acetic acid and then vacuum dried overnight (26 g), 91% yield, mp=255–257° C. The solid was recrystallized three times from ethanol so as to obtain a monomer grade material. Anal. Calcd. for $C_{20}H_{14}O_6$: C, 68.57; H, 4.03. Found: C, 68.41; H, 4.03.

EXAMPLE III

Preparation of homopolymer I (OPDB0)

A solution of tosyl chloride (1.8987 g, 9.959 mmol), in pyridine (4 mL) and DMF (25 drops) was maintained at room temperature for 30 min and added to 2-bromoterephthalic acid (0.9384 g, 3.830 mmol) in pyridine (2 mL). The mixture was maintained at room temperature for 10 min and then at 120° C. for 10 min. To this solution was added, dropwise over 15 min at 120° C., phenylhydroquinone (0.7133 g, 3.831 mmol) in pyridine (9 mL). The reaction was maintained at 120° C. for 3 h. The resulting polyester, was isolated by precipitation with methanol. The precipitate was filtered and washed with methanol and dried. Purification was carried out by dissolving the polymer in dimethylacetamide, filtering and precipitating into methanol. Vacuum oven drying at 75° C. for 15 h gave pure polymer (1.51 g), 100% yield. IR (KBr, cm⁻¹): 1744, 1477, 1277, 1231, 1164, 1084, 1026, 898 and 698. [η]=0.958 g/dL (methanesulfonic acid, 30° C.). Anal. Calcd. for $C_{20}H_{11}BrO_4$: C, 60.78; H, 2.81; Br, 20.22. Found: C, 60.11; H, 2.84; Br, 18.48.

EXAMPLE IV

Preparation of homopolymer II (OPDB100)

A solution of tosyl chloride (1.5012 g, 7.874 mmol), in pyridine (4 mL) and DMF (25 drops) was maintained at room temperature for 30 min and added to 4,4'-(1,2-benzenedioxy)dibenzoic acid (1.0608 g, 3.028 mmol) in pyridine (2 mL). The mixture was maintained at room temperature for 10 min and then at 120° C. for 10 min. To this solution was added, dropwise over 15 min at 120° C., phenylhydroquinone (0.5639 g, 3.028 mmol) in pyridine (9 mL). The reaction was maintained at 120° C. for 3 h. The resulting polyester was isolated by precipitation with methanol. The precipitate was filtered and washed with methanol and dried. Purification was carried out by dissolving the polymer in chloroform, filtering and precipitating into methanol. Vacuum oven drying at 75° C. for 15 h gave pure polymer (1.51 g), 100% yield. IR (KBr, cm$^{-1}$): 1737, 1492, 1261, 1157, 1069 and 1011. [η]=0.330 g/dL. Anal. Calcd. for $C_{32}H_{20}O_6$: C, 76.79; H, 4.03. Found: C, 75.96; H, 3.72.

EXAMPLE V

Preparation of Copolyester I (90:10) (OPDB10)

A solution of tosyl chloride (1.5011 g, 7.874 mmol), in pyridine (4 mL) and DMF (25 drops) was maintained at room temperature for 30 min and added to a mixture of 2-bromoterephthalic acid (0.6678 g, 2.725 mmol) containing 4,4'-(1,2-benzenedioxy)dibenzoic acid (0.1061 g, 0.3029 mmol) in pyridine (2 mL). The mixture was maintained at room temperature for 10 min and then at 120° C. for 10 min. To this solution was added, dropwise over 15 min at 120° C., phenylhydroquinone (0.5639 g, 3.028 mmol) in pyridine (6.5 mL). The reaction was maintained at 120° C. for 3 h. The resulting copolyester was isolated by precipitation with methanol. The precipitate was filtered and washed with methanol and dried. Purification was carried out first by dissolving the polymer in dimethylacetamide, filtering and precipitating into methanol. Vacuum oven drying at 75° C. for 15 h gave pure polymer (1.23 g), 100% yield. IR (KBr, cm$^{-1}$): 1742, 1477, 1275, 1229, 1162, 1080, 1026, 896, 760, 737 and 698. [η]=0.710 g/dL. Anal. Calcd. for $C_{21.2}H_{11.9}Br_{0.9}O_{4.2}$: C, 62.76; H, 2.96; Br, 17.72. Found C, 62.53; H, 2.74; Br, 17.82.

EXAMPLE VI

Preparation of copolyester II (80:20) (OPDB20)

A solution of tosyl chloride (1.5011 g, 7.874 mmol), in pyridine (4 mL) and DMF (25 drops) was maintained at room temperature for 30 min and added to a mixture of 2-bromoterephthalic acid (0.5936 g, 2.422 mmol) containing 4,4'-(1,2-benzenedioxy)dibenzoic acid (0.2122 g, 0.6057 mmol) in pyridine (2 mL). The mixture was maintained at room temperature for 10 min and then at 120° C. for 10 min. To this solution was added dropwise, over 15 min at 120° C., phenylhydroquinone (0.5639 g, 3.028 mmol) in pyridine (6.5 mL). The reaction was maintained at 120° C. for 3 h. The resulting copolyester was isolated by precipitation with methanol. The precipitate was filtered and washed with methanol and dried. Purification was carried out by dissolving the polymer in dimethylacetamide, filtering and precipitating into methanol. Vacuum oven drying at 75° C. for 15 h gave pure polymer (1.24 g), 99% yield. IR (KBr, cm$^{-1}$): 1740, 1478, 1273, 1229, 1160, 1077, 1026, 894, 760, 737 and 698. [η]=0.759 g/dL. Anal. Calcd for $C_{22.4}H_{12.8}Br_{0.8}O_{4.4}$: C, 64.63; H, 3.10; Br, 15.36. Found C, 64.20; H, 2.93; Br, 15.62.

EXAMPLE VII

Preparation of Copolyester III (70:30) (OPDB30)

A solution of tosyl chloride (1.5078 g, 7.910 mmol), in pyridine (4 mL) and DMF (25 drops) was maintained at room temperature for 30 min and added to a mixture of 2-bromoterephthalic acid (0.5218 g, 2.130 mmol) containing 4,4'-(1,2-benzenedioxy)dibenzoic acid (0.3196 g, 0.9122 mmol) in pyridine (2 mL). The mixture was maintained at room temperature for 10 min and then at 120° C. for 10 min. To this solution was added dropwise over 15 min at 120° C. phenylhydroquinone (0.5664 g, 3.042 mmol) in pyridine (7.0 mL). The reaction was maintained at 120° C. for 3 h. The resulting copolyester was isolated by precipitation with methanol. The precipitate was filtered and washed with methanol and dried. Purification was carried out by dissolving the polymer in dimethylacetamide, filtering and precipitating into methanol. Vacuum oven drying at 75° C. for 15 h gave pure polymer (1.30 g), 100% yield. IR (KBr, cm$^{-1}$) 1736, 1650, 1493, 1264, 1230, 1158, 1076, 757 and 698. [η]=0.577 g/dL. Anal. Calcd. for $C_{23.6}H_{13.7}Br_{0.7}O_{4.6}$: C, 66.42; H, 3.24; Br, 13.11. Found: C, 64.91; H, 3.36; Br, 12.55.

EXAMPLE VIII

Preparation of copolyester IV (60:40) (OPDB40)

A solution of tosyl chloride (1.5080 g, 7.910 mmol), in pyridine (4 mL) and DMF (25 drops) was maintained at room temperature for 30 min and added to a mixture of 2-bromoterephthalic acid (0.4473 g, 1.825 mmol) containing 4,4'-(1,2-benzenedioxy)dibenzoic acid (0.4263 g, 1.217 mmol) in pyridine (2 mL). The mixture was maintained at room temperature for 10 min and then at 120° C. for 10 min. To this solution was added dropwise over 15 min at 120° C. phenylhydroquinone (0.5665 g, 3.042 mmol) in pyridine (7.0 mL). The reaction was maintained at 120° C. for 3 h. The resulting copolyester was isolated by precipitation with methanol. The precipitate was filtered and washed with methanol and dried. Purification was carried out first by dissolving the polymer in dimethylacetamide, filtering and precipitating into methanol. Vacuum oven drying at 75° C. for 15 h gave pure polymer (1.33 g), 100% yield. IR (KBr, cm$^{-1}$) 1735, 1587, 1482, 1266, 1227, 1155, 1065, 1024, 891, 846, 756, and 697. [η]=0.542 g/dL. Anal. Calcd. for $C_{24.8}H_{14.6}Br_{0.6}O_{4.8}$: C, 68.11; H, 3.36; Br, 10.96. Found C, 66.92; H, 3.16; Br 10.92.

EXAMPLE IX

Preparation of copolyester V (50:50) (OPDB50)

A solution of tosyl chloride (1.5013 g, 7.875 mmol), in pyridine (4 mL) and DMF (25 drops) was maintained at room temperature for 30 min and added to a mixture of 2-bromoterephthalic acid (0.3710 g, 1.514 mmol) containing 4,4'-(1,2-benzenedioxy)dibenzoic acid (0.5305 g, 1.514 mmol) in pyridine (2 mL). The mixture was maintained at room temperature for 10 min and then at 120° C. for 10 min. To this solution was added dropwise over 15 min at 120° C. phenylhydroquinone (0.5639 g, 3.028 mmol) in pyridine (6.5 mL). The reaction was maintained at 120° C. for 3 h. The resulting copolyester was isolated by precipitation with methanol. The precipitate was filtered and washed with methanol and dried. Purification was carried out by dissolving the polymer in dimethylacetamide, filtering and precipitating into methanol. Vacuum oven drying at 75° C. for 15 h gave pure polymer (1.34 g), 99% yield. IR (KBr, cm$^{-1}$): 1739, 1607, 1488, 1263, 1230, 1160, 1071, 1030, 894, 851, 760 and 699. [η]=0.489 g/dL. Anal. Cald. for $C_{26}H_{15.5}Br_{0.5}O_5$: C, 69.73; H, 3.49; Br, 8.92. Found: C, 69.32; H, 3.24; Br, 9.06.

EXAMPLE X

Characterization of Polymers and Copolymers

The solution characterizations the polymers and copolymers prepared above, are given in Table I:

TABLE 1

Solution characterization

| Polymer | Actual | | Observed* | | $M_n^\#$ | $M_w^\#$ | $M_w/M_n$ | [η] g/dL |
|---|---|---|---|---|---|---|---|---|
| | A | B | A | B | | | | |
| OPDB0 | 1 | 0 | — | — | 13793 | 36739 | 2.66 | 0.958 |
| OPDB10 | 0.9 | 0.1 | 0.91 | 0.09 | 12420 | 30791 | 2.56 | 0.710 |
| OPDB20 | 0.8 | 0.2 | 0.81 | 0.19 | 10791 | 31237 | 2.89 | 0.759 |
| OPDB30 | 0.7 | 0.3 | 0.67 | 0.33 | 13192 | 35372 | 2.68 | 0.577 |
| OPDB40 | 0.6 | 0.4 | 0.60 | 0.40 | 15342 | 40019 | 2.60 | 0.542 |
| OPDB50 | 0.5 | 0.5 | 0.51 | 0.49 | 5581 | 23958 | 4.29 | 0.489 |
| OPDB100 | 0.0 | 1.0 | — | — | 11614 | 35342 | 3.04 | 0.330 |

*% Composition was calculated from elemental analysis of bromine content in the polymer backbone.
$M_n$ and $M_w$ data were measured relative to polystyrene standards using GPC. Solutions were prepared in DMAc.

Thermal characterization of the OPDBn polymers, summarized in Table 2, below, revealed that the polymers all had modest glass transition temperatures ($T_g$), ranging from 108° C. to 138° C., and quite low melting points. The homopolymer OPDB0 exhibited two weak melting transitions at $T_{m1}$=190° C. and $T_{m2}$=215° C., while OPDB10 and OPDB20 exhibited melting points of 230° and 232° C., respectively. The rest of the OPDBn polymers exhibited DSC traces free of any melting endotherm. These data, along with polarizing optical microscopy (POM) observations, indicate that the polymers OPDB50 and OPDB100 are purely amorphous thermoplastics. Of the polymers that were observed to possess a nematic liquid crystalline phase, several (OPDB20, OPDB30 and OPDB40) featured a nematic-isotropic clearing transition temperature ($T_{ni}$) below 400° C. For these polymers, POM observations exhibited a clear loss of optical birefringence at T=375, 275 and 250° C., respectively, above which temperature each sample transformed from a turbid nematic to a clear liquid appearing dark between crossed polarizers. Increasing the content of flexible $Ar^3$ unit to 30 mole % further lowered the clearing temperature to 275° C., thus allowing the control of clearing temperature of this wholly aromatic polyester system with a simple adjustment in the co-monomer stoichiometry.

The polymers were found to feature good thermal stability, as indicated in Table 2, marked by decomposition onset temperatures ($T_{dec}$) in the range of 450° to 490° C. A slight improvement in the thermal decomposition temperatures with increasing OPDB percentage was noted. The char yield (material remaining at T=900° C.) was found to be independent of the polymer composition and was relatively high at 40%.

TABLE 2

| Polymer | $T_g$ | $T_{m1}$ | $T_{m2}$ | $T_{ni}$ | $T_{dec}$ | $m_{ch}$** |
|---|---|---|---|---|---|---|
| OPDB0 | 108 | 190 | 215 | — | 463 | 37.3 |
| OPDB10 | 129 | 230 | — | — | 454 | 40.0 |
| OPDB20 | 133 | 232 | — | — (375, POM) | 459 | 41.8 |
| OPDB30 | 142 | 228 | — | — (275, POM) | 469 | 34.8 |
| OPDB40 | 139 | 226 | — | 250 (250, POM) | 459 | 38.5 |
| OPDB50 | 138 | — | — | — | 464 | 40.2 |
| OPDB100 | 136 | — | — | — | 493 | 39.6 |

**$m_{ch}$ is percentage of initial mass

Nematic textures of OPDB0, OPDB10, and OPDB20 were visible in the polarizing optical microscope (POM) when samples were prepared by casting from 1 wt. % solutions in DMAc solvent followed by vacuum drying and thermal annealing at 250° C. These three polymers all show classic nematic ordering and textures.

As-synthesized powders of the same polymers were prepared for POM by melting directly onto the glass plate of a custom heating stage, followed by squeezing with a cover slip or shearing with a heated razor. Using this procedure, textures distinct from those observed for solution casting, were observed. Instead, we found banded textures immediately following shear, followed by quite uniform birefringence after long-time annealing. We found that the tendency to form bands following shear followed the order OPDB0<OPDB10<OPDB20.

Fibers prepared by drawing from the melt of the custom heating stage revealed significant orientation of the macromolecular chains, as indicated in wide-angle x-ray scattering (WAXS) observations by concentration of the interchain spacing reflection on the equator for OPDB0, OPDB20, and OPDB100. The level of orientation was found to be strongly dependent on the composition of the polymers, with OPDB0 featuring the highest orientational order (<P2>=0.31), OPDB20 featuring an intermediate level of orientational order (<P2>=0.18) and OPDB50 featuring the lowest orientational order (<P2>=0.06). <P2> is a measure of orientational order ranging in magnitude from 0 for a disoriented material to 1 for a perfectly uniaxially ordered material. In addition to the concentration of the interchain spacing peak on the equator, the nematic polymers show strong layer line peak(s) on the WAXS meridian.

The copolyesters of the present invention may be used for high strength/high modulus fibers, novel composites, films with excellent barrier properties, precision-molded articles, and the like.

Having thus described exemplary embodiments of the present invention, it should be noted by those skilled in the art that the disclosures herein are exemplary only and that alternatives, adaptations and modifications may be made within the scope of the present invention.

We claim:
1. A wholly aromatic copolyester having repeating units of the formula:

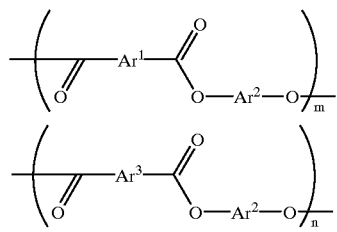

wherein $Ar^1$ is

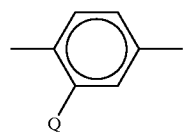

wherein Q is selected from the group consisting of —H, —$CH_3$, —$CF_3$, —Cl, —Br, and —$C_6H_5$;

wherein Ar² is selected from the group consisting of

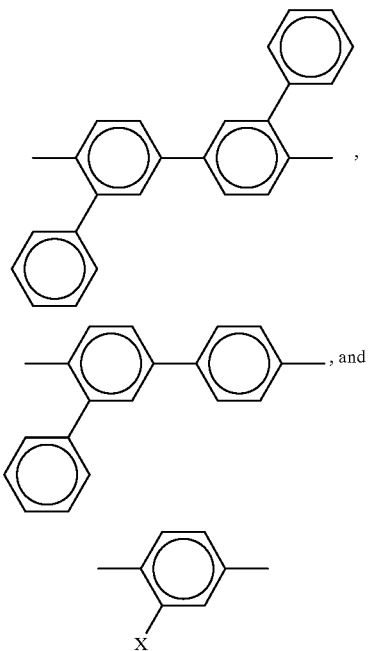

wherein X is selected from the group consisting of —Br, —Cl, —CH₃ and —C₆H₅;
wherein Ar³ is

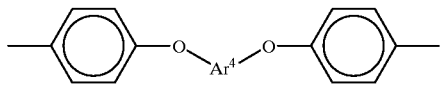

wherein Ar⁴ is selected from the group consisting of

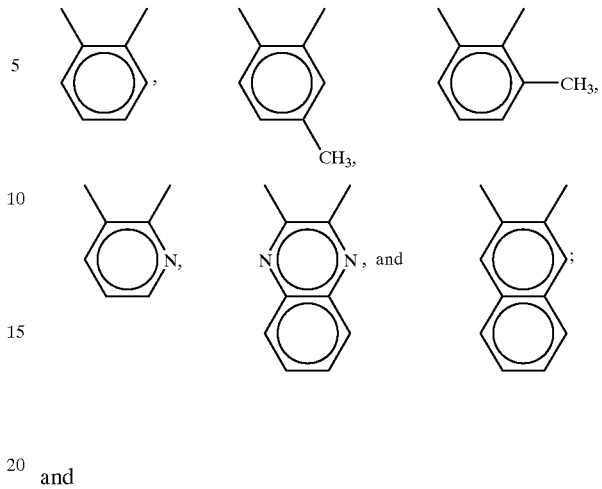

and wherein m has a value of 0.05 to 0.95 and n has a value of 100-m.

2. The copolyester of claim 1 wherein m has a value of 0.10 to 0.90.

3. The copolyester of claim 1 wherein m has a value of 0.60 to 0.80.

4. The copolyester of claim 1 wherein Ar¹ is derived from 2-bromoterephthalic acid.

5. The copolyester of claim 1 wherein Ar² is derived from phenylhydroquinone.

6. The copolyester of claim 1 wherein Ar³ is derived from 4,4'-(1,2-benzenedioxy)dibenzoic acid.

* * * * *